S. C. LONGSHORE.
Harvester Rake.
No. 18,462.
Patented Oct. 20, 1857.
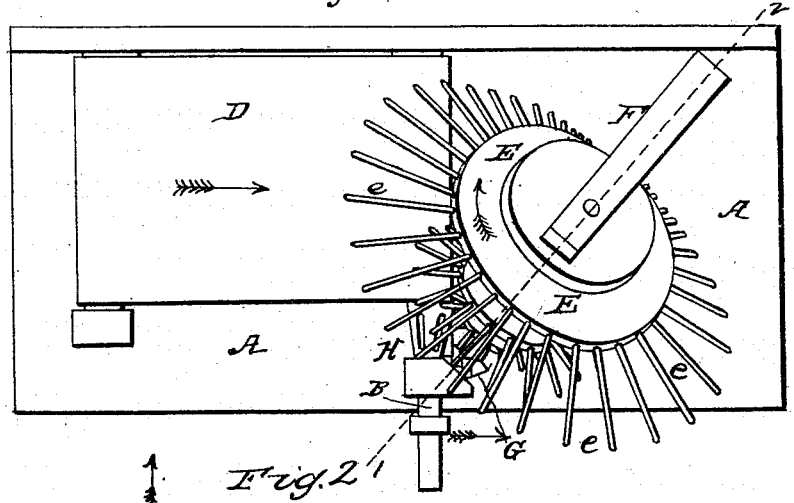
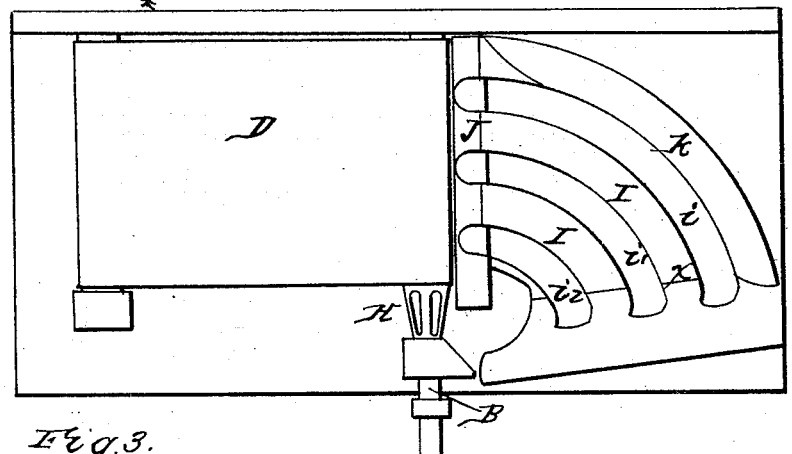
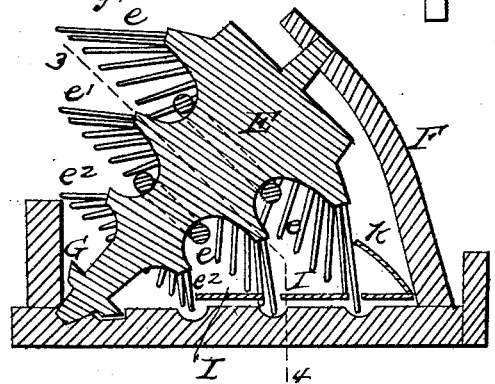
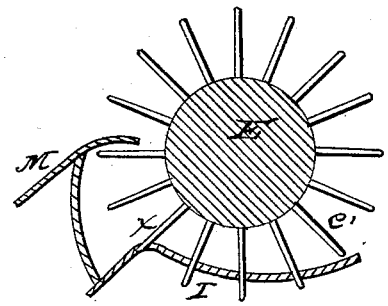
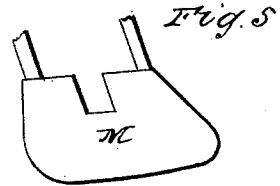

UNITED STATES PATENT OFFICE.

SAMUEL C. LONGSHORE, OF LAHASKA, PENNSYLVANIA.

IMPROVED SWATHING APPARATUS FOR HARVESTERS.

Specification forming part of Letters Patent No. 18,462, dated October 20, 1857.

*To all whom it may concern:*

Be it known that I, SAMUEL C. LONGSHORE, of Lahaska, Bucks county, and State of Pennsylvania, have invented a new and Improved Swathing Apparatus for Harvesters; and I do hereby declare the following to be a full, clear, and exact description of the same, reference being had to the accompanying drawings, and to the letters of reference marked thereon.

My invention relates to improvements in machinery for removing from the platforms of harvesters the severed stalks of grain or grass, and depositing them on the ground in a line parallel, or thereabout, with that of the cutters; and my improvements consist in the employment of a revolving cone-shaped rake, the axis of which is situated at angle with the line of cutters, as well as with the plane of the platform, the rake acting in conjunction with an endless apron, recesses in the platform, and a curved projection on the same, all of which are fully described hereinafter, so that the severed grain or grain is effectually deposited on the ground in a continuous swath.

In order to enable others skilled in the art to make and use my invention, I will now proceed to describe its construction and operation.

On reference to the drawings, which form a part of this specification, Figure 1 is a ground plan of my improved swathing apparatus for harvesters; Fig. 2, also a ground plan with the rotating rake removed; Fig. 3, a section on the diagonal line 1 2, Fig. 1; Fig. 4, a section on the diagonal line 3 4, Fig. 3; Fig. 5, a detached view of the guard or shield.

Similar letters refer to similar parts throughout the several views.

A is a platform secured to the back of the cutter-bar of a harvester. A shaft, B, driven by any moving parts of the machine, turns in suitable bearings attached to the platform, and is furnished with a roller, round which, as well as round a second roller, (also turning in bearings on the platform,) passes an endless apron, D.

E is the rotating rake, having three sets of teeth, $e$, $e'$, and $e^2$, (see Fig. 3,) and turning at the top in the bracket F and at the bottom in the platform. The axis of rotation of the revolving rake is situated at an angle with the plane of the platform, as well as with the direction of the apron and line of cutters. On the bottom of the raker E is a wheel, G, with oblique teeth gearing into the teeth of the pinion H on the shaft B.

I is a stationary plate, inclining upward from the point where it is secured to the bar J on the platform to the point $x$, from whence it again inclines downward, with an abrupt descent, to the platform. This plate I has curved recesses $i$, $i'$, and $i^2$, into which the arms $e$, $e'$, and $e^2$ of the rotating rake project as the latter revolves. The plate I is furnished with a curved projection, $k$, the object of which will be apparent hereinafter. Secured in any convenient manner to the platform, and directly above this abrupt inclination of the plate I, is a guard or shield, M.

The shaft B is so geared to any working part of the machine that when the latter is drawn over the ground the shaft turns so as to cause the endless apron to traverse in the direction of the arrow, simultaneously with which movement the raker is caused to revolve by the pinion H and wheel G in the direction of its arrow. As the grain or grass is severed by the cutters of the harvester it falls onto the endless apron, which conveys it toward the raker. Now, the sets of teeth of the raker are so regulated as to length, and the axis of the raker itself is situated at such an angle with the surface of the platform, that the ends of the teeth catch the grain or grass just as it is about being carried over the roller by the endless apron, the teeth of the raker conveying it in a radiating direction along the surface of the plate I, and allowing it to fall to the ground down the abrupt inclination of the latter, the guard M preventing any tendency to carry up the stalks of grain any higher than necessary. As the stalks of grain or grass are carried over the plate I they are confined to their proper position by means of the curved projection $k$. It will thus be seen that as a harvester with the above-described apparatus is drawn over the ground the severed grain or grass must be deposited on the ground with their stocks in a line parallel, or thereabout, with the line of cutters, and in a continuous swath, thereby allowing the grain or grass an opportunity to dry much quicker than when deposited on the ground in heaps.

I do not desire to claim exclusively the depositing of the severed grain or grass onto the ground in a line with the cutters, or the employment of a cone-shaped rake for effecting that purpose; but

What I claim, and desire to secure by Letters Patent, is—

The angular rotating rake, in combination with the endless apron, and the plate I, with its recesses $i$ and projection $k$, when the whole is arranged and constructed substantially in the manner and for the purpose herein set forth.

In testimony whereof I have signed my name to this specification before two subscribing witnesses.

SAMUEL C. LONGSHORE.

Witnesses:
 HENRY HOWSON,
 WILLIAM E. WALTON.